United States Patent [19]

Lomnick

[11] Patent Number: 5,538,275
[45] Date of Patent: Jul. 23, 1996

[54] BALL JOINT SEAL WITH HEAT SHIELD

[75] Inventor: Eugene Lomnick, Royal Oak, Mich.

[73] Assignee: Chrysler Corporation, Auburn Hills, Mich.

[21] Appl. No.: 525,816

[22] Filed: Sep. 7, 1995

Related U.S. Application Data

[63] Continuation of Ser. No. 168,297, Dec. 17, 1993, abandoned.

[51] Int. Cl.[6] ............................................. B60G 25/00
[52] U.S. Cl. ............................ 280/674; 277/212 FB; 464/173
[58] Field of Search ............................ 280/673, 674; 277/212 F, 212 FB, 212 R, 122, 119, 28, 11, 23, 134; 464/173, 17

[56] References Cited

U.S. PATENT DOCUMENTS

| | | | |
|---|---|---|---|
| 4,121,844 | 10/1978 | Nemoto et al. | 277/212 FB |
| 4,159,832 | 7/1979 | Inbody | 280/674 |
| 4,546,985 | 10/1985 | Forch | 277/134 |
| 4,553,763 | 11/1985 | Ehrmann | 277/134 |
| 4,575,114 | 3/1986 | Camp | 280/673 |
| 5,233,832 | 8/1993 | Moore, III | 60/323 |
| 5,346,431 | 9/1994 | Okuyama et al. | 464/173 |

FOREIGN PATENT DOCUMENTS

| | | | |
|---|---|---|---|
| 0459644 | 12/1991 | European Pat. Off. | B60G 7/00 |
| 0570736 | 11/1993 | European Pat. Off. | F16C 11/06 |

OTHER PUBLICATIONS

EP 94119782 Search Report.

*Primary Examiner*—Eric D. Culbreth
*Attorney, Agent, or Firm*—Christopher A. Taravella

[57] ABSTRACT

A rubber seal for vehicular ball joint assemblies located in the vicinity of a source of heat. The seal includes an integrally molded metal heat shield for facing the source of heat to prevent the deterioration of the seal from the heat. Such a seal with integral heat shield is particularly beneficial between a vehicle brake rotor and lower control arm and/or a tie rod operatively connected to a steering knuckle.

13 Claims, 3 Drawing Sheets

BALL JOINT SEAL WITH HEAT SHIELD

CROSS-REFERENCE TO RELATED APPLICATION

This application is a Continuation of application Ser. No. 08/168,297, filed Dec. 17, 1993, abandoned.

TECHNICAL FIELD

This invention relates generally to resilient seals for covering vehicular ball joints and, more particularly, to such seals which are subjected to heat from adjacent apparati which may eventually result in the deterioration of the seal.

1. Background Art

Heretofor, resilient seals mounted around particular ball joint assemblies which are in the vicinity of heat-inducing devices, such as a vehicle brake rotor, have been prone to eventually melt through, to thereby open up to deleterious outside effects, such as water and/or dirt, which are capable of destroying the ball joint's function.

2. Disclosure of the Invention

A general object of the invention is to provide an improved ball joint seal arrangement including means for shielding same from any heat which may be generated in the immediate vicinity.

Another object of the invention is to provide a ball joint seal with an integral heat shield.

A further object of the invention is to provide a rubber seal for covering a ball joint assembly, wherein the rubber seal includes an integrally molded metal heat shield for protecting the body of the seal from an adjacent heat source.

These and other objects and advantages will become more apparent when reference is made to the following drawings and accompanying description.

BEST MODE OF CARRYING OUT THE INVENTION

Figure 1:
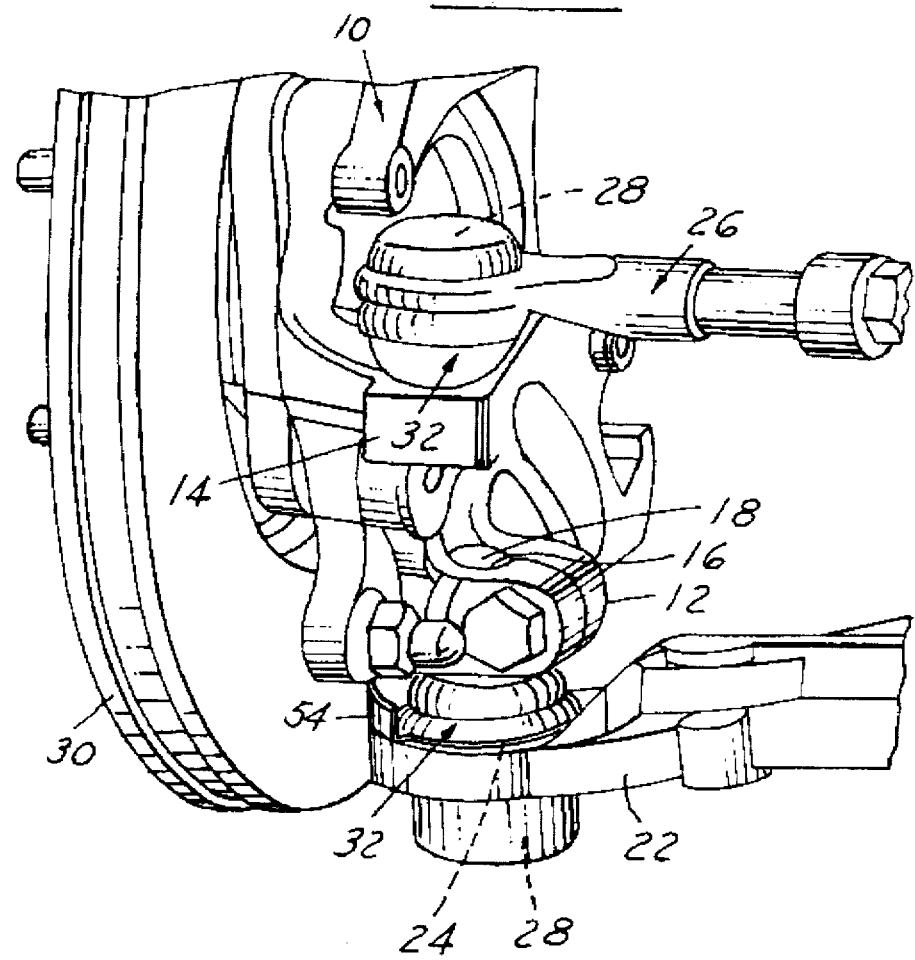
FIG. 1 is a perspective view of a vehicle's steering knuckle, lower control arm, tie rod, and brake rotor assembly embodying the invention.
Figure 3:
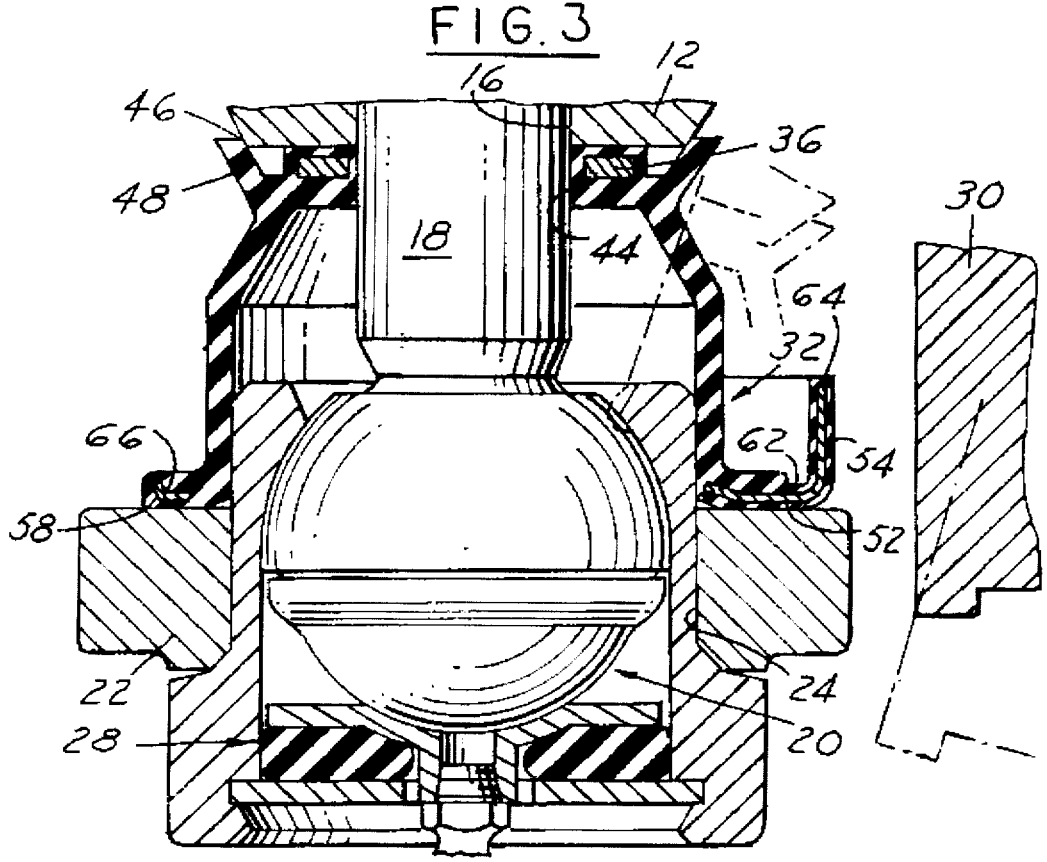
FIG. 3 is an enlarged cross-sectional view of portions of the FIG. 1 structure showing various operational positions thereof.
Figure 4:
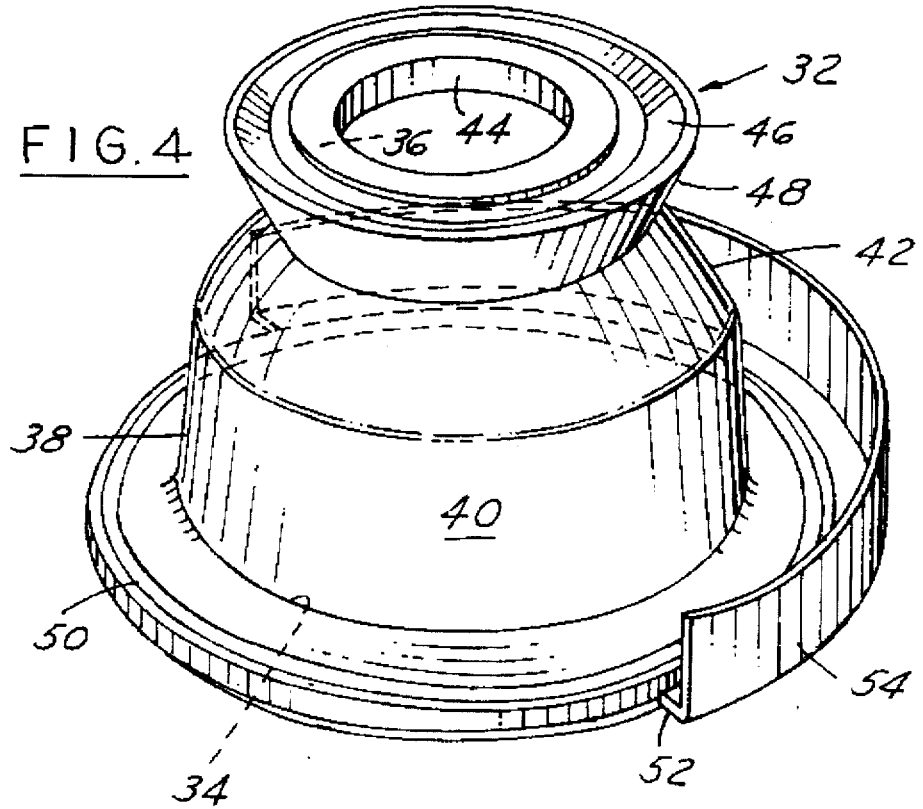
FIG. 4 is an enlarged perspective view of a component of the FIG. 1 structure which embodies the crux of the invention.

Referring now to the drawings in greater detail, FIG. 1 illustrates a vehicle steering knuckle 10 including a ball joint stud boss 12 and a knuckle arm 14, each having an opening 16 and 16' formed adjacent the respective distal ends thereof adapted to tightly receive a stud 18 extending from a ball joint assembly 20 (FIG. 3). A lower control arm 22 includes a through-bore 24 formed adjacent the distal end thereof for receiving the ball joint assembly 20. The arm 14 has a tapered opening 16 for receiving the stud 18 of a tie rod assembly 26. A suitable seat assembly 28 (FIG. 3) associated with each of the tie rod assembly 26 and the through-bore 24 of the lower control arm 22 is adapted to receive the ball joint assembly 20. A brake rotor 30 is positioned adjacent the steering knuckle 10.

A molded rubber ball joint housing seal with integral heat shield assembly 32 is mounted intermediate each arm 12 and 14 distal end and the respective lower control arm 22 and tie rod assembly 26. The assembly 32 comprises, between large and small diameter open ends 34 and 36, respectively, a hollow body 38 having a first cylindrical portion 40 continuing as a partial spherical portion 42, and terminating with an internal flange 44 encompassing a metal washer. An annular concentric recess 46 is formed between the internal flange 44 and a flared-out rubber flange 48.

An external flange 50 is formed around the large diameter open end 34. An arcuate lateral extension 52 is formed on approximately one third of the peripheral edge of the flange 50. An arcuate longitudinal extension 54 is formed on the outer edge of the lateral extension 52, serving as a heat shield adjacent the brake rotor 30.

Figure 5:
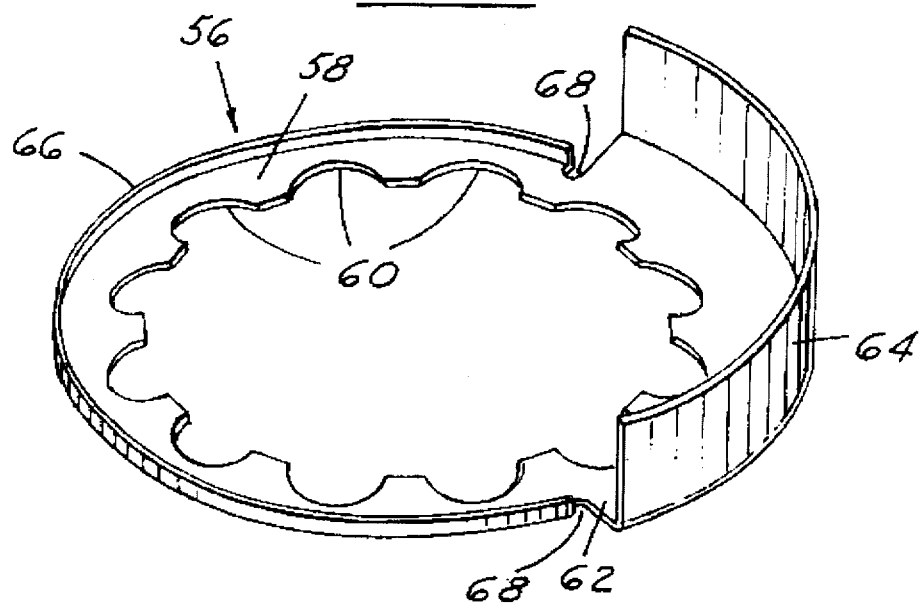
FIG. 5 is a perspective view of an element embodied in the FIG. 4 component.
Figure 2:
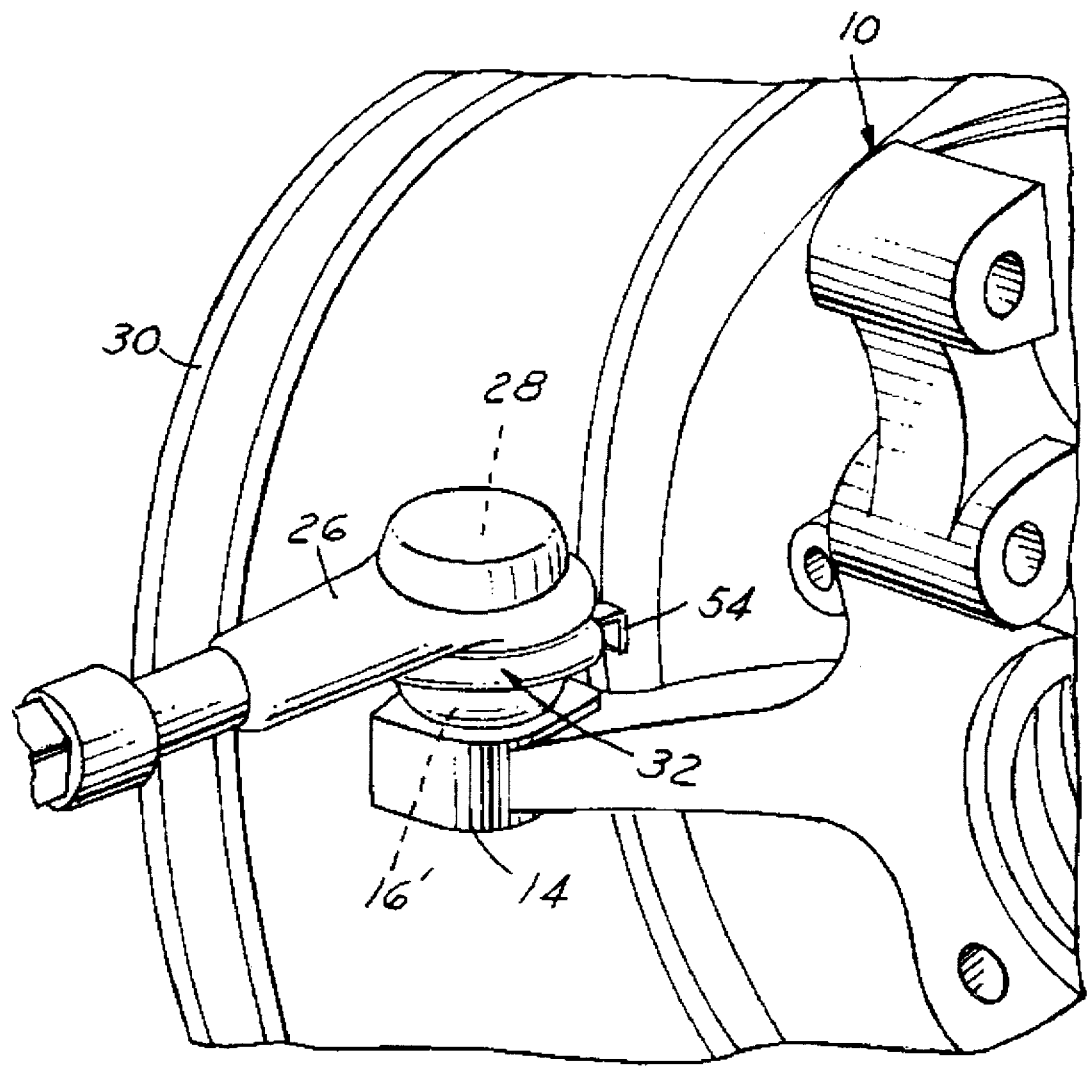
FIG. 2 is an enlarged fragmentary perspective view of a portion of the FIG. 1 structure, as viewed from a different direction.

Molded within the external flange 50, the arcuate lateral extension 52 and the arcuate longitudinal extension 54 is a steel insert 56. As shown in FIG. 5, the steel insert 56 incudes a washer 58 having a plurality of say, twelve, half circle equally spaced cut-outs 60 formed in the inner peripheral edge formed therein. A co-planar outwardly extending arcuate segment 62 is formed on approximately one-third of outer periphery of the washer 58. A longitudinally extending arcuate segment 64 is formed on the outer peripheral edge of the segment 62, the elements 62 and 64 being molded within the elements 52 and 54. A further short longitudinally extending arcuate segment 66 is formed on the outer peripheral edge of the washer 58 extending for substantially the remaining two-thirds of the washer, with a narrow space 68 between each pair of adjacent ends of the respective arcuate segments 64 and 66.

Industrial Applicability

It is apparent that, as an integrally molded unit, the rubber covered arcuate segment 64 serves as an efficient heat shield between the brake rotor 30 and the rubber housing seal, with the assembly 32 being reinforced by the washer 58 and the outer arcuate segment 66 within the external flange 50.

While but one embodiment of the invention has been shown and described, other modifications are possible within the scope of the following claims.

What is claimed is:

1. For use on a ball joint assembly adjacent a source of heat, a ball joint seal device including a rubber housing adapted to mount on said ball joint assembly, the improvement comprising said ball joint seal device having a heat shield formed integrally therewith adjacent said source of heat.

2. The improvement described in claim 1, wherein said ball joint assembly is adapted to mount between a steering knuckle boss and a lower control arm, and said source of heat is a brake rotor.

3. The improvement described in claim 1, wherein said ball joint is adapted to mount between a steering knuckle arm and a tie rod, and said source of heat is a brake rotor.

4. The improvement described in claim 1 wherein said heat shield comprises said rubber housing having a circumferentially extending flange, said flange having an arcuate lateral projection extending from a portion of said flange adjacent said heat source and an arcuate longitudinal extension extending from an outer edge of said arcuate lateral projection generally perpendicular thereto.

5. The improvement described in claim 4 wherein said ball joint seal device further includes a steel-insert molded within said circumferentially extending flange.

6. The improvement described in claim 5 wherein said steel-insert includes an arcuate lateral projection and an arcuate longitudinal extension extending from an outer edge of said arcuate lateral projection of said steel-insert generally perpendicular thereto, the arcuate lateral extension and arcuate longitudinal extension of said steel insert molded within said arcuate lateral extension and said arcuate longitudinal extension of said circumferentially extending flange of said rubber housing.

7. For covering each of a first ball joint assembly between a first arm element of a vehicle steering knuckle and an end portion of a lower control arm, and a second ball joint assembly between a second arm element of said steering knuckle and an end portion of a tie rod, both ball joint assemblies being positioned adjacent a brake rotor, a pair of ball joint seal devices each comprising a rubber housing adapted to mount around a respective one of said first and second ball joint assemblies, and each said rubber housing having a heat shield formed integrally therewith, said heat shield comprising a steel insert integrally molded within one end of each said rubber housing, characterized by an arcuate-shaped steel flange external of said one end and formed on a portion of a peripheral edge of said steel insert adjacent said brake rotor and integrally molded in an extension of said rubber housing.

8. A Ball joint assembly located adjacent a source of heat and comprising a ball joint pivotally mounted in an opening formed in a surrounding first movable member, a stud extending from said ball joint and secured in an opening in a second movable member, and a seal device having a partial spherical rubber body having oppositely disposed open ends mounted around said stud and at least a portion of said ball joint intermediate said first and second movable members, an external flange formed on one of said open ends, said seal device having a heat shield disposed thereon adjacent said source of heat, said heat shield comprising a steel insert integrally molded in said external flange, and a concentric longitudinally extending steel flange formed on said steel insert external of said external flange and integrally molded on a peripheral edge of said external flange adjacent said source of heat.

9. The ball joint assembly described in claim 8, wherein said second movable member is a ball joint stud boss of a steering knuckle.

10. The ball joint assembly described in claim 8, wherein said first movable member is a lower control arm.

11. The ball joint assembly described in claim 8, wherein said second movable member is a knuckle arm of a steering knuckle.

12. The ball joint assembly described in claim 8, wherein said first movable member is a tie rod.

13. The ball joint assembly described in claim 8, wherein said source of heat is a brake rotor.

* * * * *

UNITED STATES PATENT AND TRADEMARK OFFICE
CERTIFICATE OF CORRECTION

PATENT NO. : 5,538,275
DATED : July 23, 1996
INVENTOR(S) : Eugene Lomnicki It is certified that error appears in the above-identified patent and that said Letters Patent is hereby corrected as shown below:

On the title page, item [19] and [75],
Inventor surname, Lomnick, should read --LOMNICKI--.

Signed and Sealed this

Fifteenth Day of October, 1996

Attest:

BRUCE LEHMAN

Attesting Officer

Commissioner of Patents and Trademarks